(12) United States Patent
Larson (10) Patent No.: US 11,748,323 B2
(45) Date of Patent: *Sep. 5, 2023

(54) SYSTEM AND METHOD OF SEARCH INDEXES USING KEY-VALUE ATTRIBUTES TO SEARCHABLE METADATA

(71) Applicant: Open Text SA ULC, Halifax (CA)

(72) Inventor: Johan G. Larson, Toronto (CA)

(73) Assignee: Open Text SA ULC, Halifax (CA)

( * ) Notice: Subject to any disclaimer, the term of this patent is extended or adjusted under 35 U.S.C. 154(b) by 28 days.

This patent is subject to a terminal disclaimer.

(21) Appl. No.: 17/205,446

(22) Filed: Mar. 18, 2021

(65) Prior Publication Data

US 2021/0209082 A1 Jul. 8, 2021

Related U.S. Application Data

(63) Continuation of application No. 16/052,991, filed on Aug. 2, 2018, now abandoned, which is a
(Continued)

(51) Int. Cl.
*G06F 16/30* (2019.01)
*G06F 16/22* (2019.01)
(Continued)

(52) U.S. Cl.
CPC ........ *G06F 16/2228* (2019.01); *G06F 16/242* (2019.01); *G06F 16/2428* (2019.01); *G06F 16/24575* (2019.01); *G06F 16/31* (2019.01)

(58) Field of Classification Search
CPC ............... G06F 16/2228; G06F 16/242; G06F 16/2428; G06F 16/24575; G06F 16/31
See application file for complete search history.

(56) References Cited

U.S. PATENT DOCUMENTS

| 7,373,341 | B2 | 5/2008 | Polo-Malouvier |
| 8,504,534 | B1 | 8/2013 | Tendick et al. |

(Continued)

OTHER PUBLICATIONS

Office Action for U.S. Appl. No. 13/595,570, dated Jan. 3, 2014, 8 pgs.

(Continued)

*Primary Examiner* — Khanh B Pham
(74) *Attorney, Agent, or Firm* — Sprinkle IP Law Group (57) ABSTRACT

Systems, methods, and computer program products for searching objects, metadata associated with the objects, and attributes assigned to or associated with the metadata. Referring to herein as metadata for the metadata, these attributes may be associated with one or more metadata field values of a metadata field name which, in turn, may be associated with an object being or already indexed in a search index of a search system. Each attribute may be optional, dynamically created, indexed, and searchable via the search index. There can be multiple attributes associated with the same metadata field value, each being represented as a key-value pair. This metadata for the metadata approach can be highly efficient. For example, the ability to search multiple attributes associated with the same metadata field can eliminate the potential need to create multiple metadata fields for the same value in different languages, countries, etc.

21 Claims, 4 Drawing Sheets

Related U.S. Application Data continuation of application No. 15/096,926, filed on Apr. 12, 2016, now Pat. No. 10,073,875, which is a continuation of application No. 13/595,570, filed on Aug. 27, 2012, now Pat. No. 9,348,890.

(60) Provisional application No. 61/528,960, filed on Aug. 30, 2011.

(51) Int. Cl.
  *G06F 16/31* (2019.01)
  *G06F 16/242* (2019.01)
  *G06F 16/2457* (2019.01)

(56) References Cited

U.S. PATENT DOCUMENTS

| | | | |
|---|---|---|---|
| 9,348,890 | B2 | 5/2016 | Larson |
| 10,073,875 | B2 | 9/2018 | Larson |
| 10,803,045 | B2 | 10/2020 | Raghavan et al. |
| 2005/0004933 | A1 | 1/2005 | Potter |
| 2005/0050548 | A1 | 3/2005 | Sheinis et al. |
| 2006/0031263 | A1 | 2/2006 | Arrouye et al. |
| 2008/0033944 | A1* | 2/2008 | Frank ............... G06F 16/9537 |
| 2008/0065699 | A1 | 3/2008 | Bloebaum et al. |
| 2008/0270462 | A1 | 10/2008 | Thomsen |
| 2008/0281781 | A1* | 11/2008 | Zhao ................. G06F 16/38 |
| 2008/0313498 | A1* | 12/2008 | Jennings ............. G06F 16/27 |
| | | | 714/E11.002 |
| 2009/0044095 | A1 | 2/2009 | Berger et al. |
| 2009/0089315 | A1 | 4/2009 | Jeffery et al. |
| 2009/0119255 | A1 | 5/2009 | Frank et al. |
| 2009/0222434 | A1 | 9/2009 | Fothergill |
| 2012/0179702 | A1 | 7/2012 | Nozaki et al. |
| 2012/0290558 | A1 | 11/2012 | Gruber |
| 2013/0166573 | A1 | 6/2013 | Vaitheeswaran et al. |
| 2013/0194308 | A1 | 8/2013 | Privault |
| 2013/0346444 | A1 | 12/2013 | Makkar et al. |
| 2014/0244236 | A1 | 8/2014 | Johnson |
| 2018/0373742 | A1 | 12/2018 | Larson |
| 2020/0394173 | A1 | 12/2020 | Raghavan et al. |

OTHER PUBLICATIONS

Office Action for U.S. Appl. No. 13/595,570, dated Apr. 10, 2014, 8 pgs.
Office Action for U.S. Appl. No. 13/595,570, dated Sep. 2, 2014, 11 pgs.
Office Action for U.S. Appl. No. 13/595,570, dated Dec. 8, 2014, 9 pgs.
Office Action for U.S. Appl. No. 13/595,570, dated Apr. 17, 2015, 9 pgs.
Office Action for U.S. Appl. No. 13/595,570, dated Aug. 18, 2015, 10 pgs.
Office Action for U.S. Appl. No. 15/096,926, dated Jan. 13, 2017, 13 pgs.
Office Action for U.S. Appl. No. 15/096,926, dated May 31, 2017, 9 pgs.
Office Action for U.S. Appl. No. 15/096,926, dated Nov. 16, 2017, 18 pgs.
Office Action for U.S. Appl. No. 15/365,262, dated Aug. 22, 2018, 26 pgs.
Office Action for U.S. Appl. No. 15/365,262, dated Mar. 5, 2019, 18 pgs.
Office Action for U.S. Appl. No. 15/365,262, dated Jul. 24, 2019, 18 pgs.
Office Action for U.S. Appl. No. 15/365,262, dated Jan. 22, 2020, 16 pgs.
Office Action for U.S. Appl. No. 16/052,991, dated Jul. 9, 2020, 11 pgs.
Office Action for U.S. Appl. No. 16/052,991, dated Dec. 18, 2020, 13 pgs.
Office Action for U.S. Appl. No. 17/006,625, dated Mar. 15, 2022, 14 pgs.
Office Action for U.S. Appl. No. 17/006,625, dated Sep. 30, 2022, 17 pgs.
Office Action for U.S. Appl. No. 17/006,625, dated Feb. 16, 2023, 7 pgs.
Office Action issued for U.S. Appl. No. 17/006,625, dated Jun. 26, 2023, 7 pages.

* cited by examiner

SYSTEM AND METHOD OF SEARCH INDEXES USING KEY-VALUE ATTRIBUTES TO SEARCHABLE METADATA

CROSS-REFERENCE TO RELATED APPLICATION(S)

This is a continuation of, and claims a benefit of priority under 35 U.S.C. 120 of the filing date of U.S. patent application Ser. No. 16/052,991, filed Aug. 2, 2018, entitled "SYSTEM AND METHOD OF SEARCH INDEXES USING KEY-VALUE ATTRIBUTES TO SEARCHABLE METADATA," which is a continuation of, and claims a benefit of priority under 35 U.S.C. 120 of the filing date of U.S. patent application Ser. No. 15/096,926, filed Apr. 12, 2016, entitled "SYSTEM AND METHOD OF SEARCH INDEXES USING KEY-VALUE ATTRIBUTES TO SEARCHABLE METADATA," issued as U.S. Pat. No. 10,073,875, which is a continuation of, and claims a benefit of priority under 35 U.S.C. 120 of the filing date of U.S. patent application Ser. No. 13/595,570, filed Aug. 27, 2012, entitled "SYSTEM AND METHOD OF SEARCH INDEXES USING KEY-VALUE ATTRIBUTES TO SEARCHABLE METADATA," issued as U.S. Pat. No. 9,348,890, which is a conversion of and claims a benefit of priority from U.S. Provisional Application No. 61/528,960, filed Aug. 30, 2011, entitled "SYSTEM AND METHOD OF SEARCH INDEXES USING KEY-VALUE ATTRIBUTES TO SEARCHABLE METADATA," which are fully incorporated by reference herein.

TECHNICAL FIELD

This disclosure relates generally to the field of computerized search systems, and more particularly to systems, methods and products which utilize key-value attributes to facilitate hybrid text and metadata search indexing and querying.

BACKGROUND OF THE RELATED ART

In computerized search systems, applications that deal with a plurality of attributes may require metadata being represented in a plurality of fields. For example, an application that deals with multiple languages would require metadata fields to also have representations for the multiple languages, and the multiple language attributes must be indexed as separate metadata fields.

One way to meet these requirements is to create a distinct metadata field for each required representation. Thus, if representations for multiple languages are required, a search index would have a "French color" field, an "English color" field, a "German color" field, and so forth, instead of a single "color" metadata field. Accordingly, when a search engine indexes a car maintenance report having "color" as a field, there may actually be one field for an English value (red), one for a French value (rouge) and one for a German value (rot), and so forth. Many problems exist with this approach. For example, too many metadata fields are created, which is not efficient and quite difficult to manage. It also lacks a clear solution for situations in which the language attribute is not known or not specified. Users formulating a search query must know which language and metadata field should be searched, and if not known, then a complex query that searches every one of the related fields must be used.

Another approach is to encode the language attributes into the values which are indexed. In this case, only one metadata field "color" is used, but the values might be: "[=English] red", "[=French] rouge", or "[=German] rot". With this approach, a query can find a value from any of the languages. However, users constructing these queries will need to use special syntax, and there are no easy ways to sort search results by language. The encoding will also fail in the unlikely event that the actual metadata to be indexed contains a value that coincidentally has the same structure as the convention used for encoding the attributes. Put another way, it is not possible to differentiate the value "red" for English from the string "[=English] red". Note that this encoding is completely arbitrary, used simply for illustration purposes—many types of encoding may be possible.

Another issue with conventional computerized search systems is that it is not possible to order or sort the search results based on the metadata values where the metadata is sparse (does not exist for every object). For example, a French user may desire to sort the results based on values in the French language. However, this is not possible since not all fields may have a French value.

Yet another issue relates to potential types of values for a single metadata field. For example, suppose a "name" metadata field has a value in French, one may wish to know whether this value is originally in French or translated from another language. Note that although "language" is used to describe example issues faced by conventional computerized search systems, these issues are not language-specific and can be unrelated to languages. For example, for performance reasons, some search systems may include only a single field for a part number and provide no additional information on whether that part number is an original value or a substitute value. Some search systems may include that information, at the cost of having discrete metadata fields, one for an original part number and another one for a substitute part number. Again, additional field(s) would need to be created and a user who is interested in this information would need to know what specific metadata fields to search for their values or use a complex query that searches every one of the related fields.

Given the deficiencies in conventional computerized search systems, including those issues described above, there is always room for innovations and improvements.

SUMMARY

This disclosure relates generally to the field of computerized search systems, and more particularly to systems, methods and products for attaching attributes, or key-value pairs, to metadata values. Embodiments can support multiple sets of attributes for a given metadata field value. In some ways, this approach can be considered as metadata for metadata.

Embodiments can also support multi-value metadata. A single record (an indexed object) may have multiple metadata field values for a given metadata field name, and each of these metadata field values may have different sets of attributes. In embodiments disclosed herein, attributes can be sparse. If attributes are sparse for a metadata field value, a given attribute does not need to be present for every metadata field value.

Embodiments allow for search queries to be formed that may target metadata field values with specific attributes, or to search within the metadata field names for metadata field values while ignoring the attributes. End users may utilize an end user interface to search an index based on the attributes of the metadata field values. The search results may then be sorted based on the attributes.

With embodiments disclosed herein, sophisticated sorting/ordering of search results is also possible. Rules for sorting may be based upon precedence, starting with an optionally specified attribute. Because attributes can be sparse, a desired attribute may not exist. To address this, a sort algorithm may have a fall back to using a system preference or "any available" metadata field value.

In some embodiments, indexing commands can be extended to allow for specifying attributes when adding or modifying metadata field values in the index. In some embodiments, querying commands can be extended to permit specification of metadata attributes within a query, and to permit specification of rules for sorting results.

In one embodiment, a method of searching an index may comprise associating an attribute with a metadata field value. In one embodiment, the attribute may be represented as a key-value pair. In one embodiment, the attribute may comprise an attribute field and a corresponding attribute value that further describes the metadata field value. The metadata field value may be associated with a metadata field name. The metadata field name may be associated with an object that is indexed in and that is searchable via a search index. The search index may be accessible by a search engine. The search engine may reside on one or more server computers. The search engine may be accessible by various computer applications and/or client devices.

A search query to the search engine may, in one embodiment, be constructed by an application. The search query may be associated with the attribute which is associated with the metadata field value which is associated with the metadata field name. Search results from the search engine may be sorted using the attribute, for instance, before being presented to a user via a user interface on a user device.

In one embodiment, the attribute may be dynamically created before, after or while the object is indexed.

In one embodiment, the attribute can be one of a plurality of attributes for the same metadata field value, each characterizing or otherwise further describing the metadata field value.

In one embodiment, the metadata field value can be one of a plurality of metadata field values for the same metadata field name.

One embodiment provides a computer program product that comprises a non-transitory computer readable medium having a set of computer instructions stored on it. The instructions are executable by a computer processor to perform a method essentially as described above.

Another embodiment provides a computerized search system comprising at least one non-transitory computer readable medium storing instructions translatable by at least one processor to perform a method essentially as described above.

Embodiments disclosed herein can provide many advantages. For example, attributes can be attached or assigned to metadata within a search index. These metadata attributes (metadata for metadata) may define or classify the metadata to which they are attached or assigned. Since such metadata attributes may further identify the characteristics of the metadata field value(s) to which they are assigned or with which they are associated, embodiments can eliminate the need to create a plurality of metadata field values for an object.

These metadata attributes may also be indexed and searchable. This provides a fast and efficient way to combine potentially related information in a search index and allow generic searching against the metadata fields. In this way, results of a search may be sorted based on specific metadata values, generic metadata fields, and/or metadata attributes. By providing attributes for metadata, the complexity of metadata fields may be reduced and/or search queries may be simplified. Following the above language example, this provides an efficient way to preserve the ability to search specific language values, and also allow generic searching against the metadata field without having to specify a particular language.

Further, embodiments provide mechanisms by which results may be sorted in a manner that may give preference to a certain language and still provide reasonable results if values for that language are sparsely populated across the fields and not available in all the fields being searched.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

DETAILED DESCRIPTION

The disclosure and various features and advantageous details thereof are explained more fully with reference to the exemplary, and therefore non-limiting, embodiments illustrated in the accompanying drawings and detailed in the following description. Descriptions of known starting materials and processes may be omitted so as not to unnecessarily obscure the disclosure in detail. It should be understood, however, that the detailed description and the specific examples, while indicating the preferred embodiments, are given by way of illustration only and not by way of limitation. Various substitutions, modifications, additions and/or rearrangements within the spirit and/or scope of the underlying inventive concept will become apparent to those skilled in the art from this disclosure.

Document management systems often employ a search engine to allow for fast retrieval of information. A search engine can search the metadata and text of documents in a search index to determine which documents match search criteria without having to parse the document itself.

When an object is added to a search system, two types of information may be indexed, one or both of full text and metadata. There are often many metadata fields for an associated object. The metadata may describe the objects being indexed. In certain cases, the metadata itself may include important information associated with the object. This metadata may need its own descriptive metadata indicating attributes of the metadata. Metadata values may require or desire to be described by a plurality of attributes such as language, color, and/or country of origin. Each of the metadata fields may have one or more values. It is desirable to efficiently index objects and search specific metadata values, while also allowing generic searching of the metadata fields.

Embodiments described herein include a method for assigning or associating attributes to indexed metadata values within a computerized search system. These attributes, which can be considered as metadata for the metadata, may be dynamically created, updated, deleted or sorted based on desired or required search parameters. This way, specific metadata values may be searched, while maintaining the ability to generically search metadata fields.

In response to a search query, a search engine may present search results with specific attribute(s) and/or metadata values. Such search results may be further sorted based on the specific attribute(s). For example, a user may search for a certain metadata value, and then sort the search results based on the attribute.

By assigning or associating attributes, which are not available in conventional computerized search systems, to metadata field values, efficient search queries may be created and instead of having to create a search query with a plurality of metadata fields, a search query may identify desired attributes with fewer fields. Upon returning the results for a search identifying such desired attributes, the search may be sorted based on the attributes. This allows search results to be sorted across different metadata fields, which previously was not possible in conventional computerized search systems.

This also allows a query length to be reduced and, correspondingly, a search may be performed more efficiently within an index, and the results may be more effectively and/or flexibly sorted.

At this point, it may be helpful to discuss an example search system.

Figure 1:
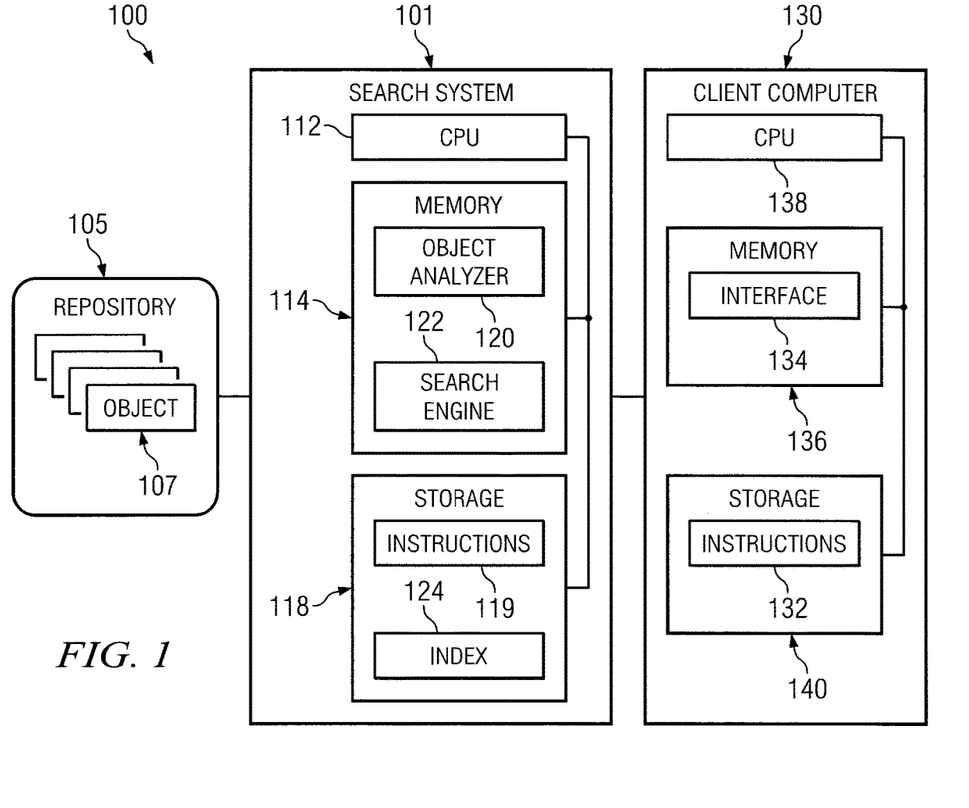
FIG. 1 depicts one embodiment of a computing environment in which one embodiment of a search system can be implemented.

FIG. 1 depicts a block diagram illustrating one embodiment of a computing environment 100 with object search system 101. Computing environment 100 includes an object repository 105 storing objects 107 of interest (documents, images, emails or other objects that may be searched). Object repository 105 may comprise a file server or database system or other storage mechanism remotely or locally accessible by search system 101.

In the embodiment of FIG. 1, search system 101 comprises a server having a central processing unit (CPU) 112 connected to a memory 114 and storage unit 118 via a bus. CPU 112 may represent a single processor, multiple processors, a processor(s) with multiple processing cores and the like. Storage unit 118 may include a non-transitory storage medium such as hard drives (HDs), flash memory devices, optical media and the like. Search system 101 may be connected to a data communications network (not shown).

Storage unit 118 stores computer executable instructions 119 and index 124. Computer executable instructions 119 can represent multiple programs and operating system code. In one embodiment, instructions 119 are executable to provide an object analyzer 120 and search engine 122. Object analyzer 120 and search engine 122 may be portions of the same program or may be separate programs. According to one embodiment, for example, object analyzer 120 is a component of a document management system while search engine 122 is a separate program that interfaces with the document management system. Furthermore, object analyzer 120 and search engine 122 can be implemented on different computing systems and can, themselves, be distributed.

Index 124 includes metadata used to identify objects in response to a search query and may also include text used to identify objects. Index 124 can include a single index containing metadata and text, separate metadata and text indices or other arrangements of information. While shown as a single index, index 124 may include multiple indices.

Client computer system 130 may include components similar to those of the server of search system 101, such as CPU 138, memory 136, and storage 140. Additionally, client computer system 130 may include executable instructions 132 to provide a user interface 134 that allows a user to enter a search query. The user interface may be provided through a web browser, file system interface or other program.

The search system 101 of FIG. 1 is merely an example of a computing system and embodiments of a search system that may be implemented using other computing systems (e.g., desktop computers, laptops, mobile computing devices or other computing devices with adequate processing and memory) including multiple computers acting together to provide a search system (e.g., a cluster of servers or other computing devices connected by a network acting together to provide the search system). Similarly, client computer 130 may include any suitable desktop computer, laptop, mobile device, server or other computing system.

In operation, object analyzer 120 analyzes objects in object repository 105 to determine information to be indexed in index 124. Object analyzer 120 can send indexing instructions to search engine 122 to direct search engine 122 to add/modify/or delete metadata or text in index 124, as discussed below. When a search query is received, search engine 122 can search the information in index 124 to identify objects responsive to the search query and return a list or other representation of those objects to client computer 130.

Figure 2:
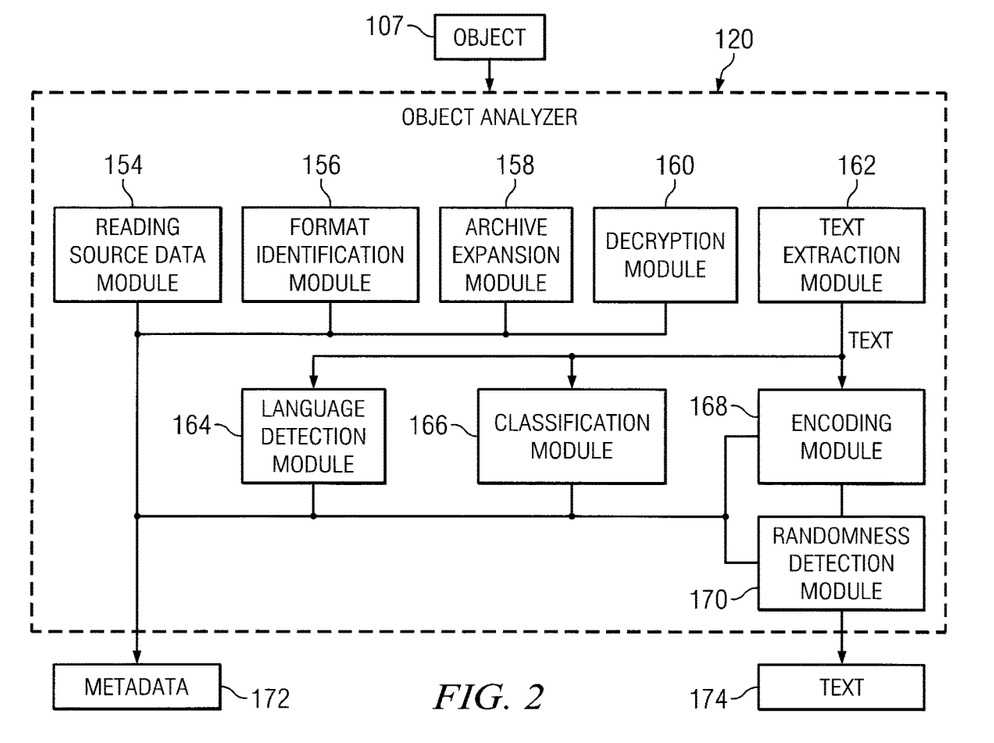
FIG. 2 depicts a functional block diagram illustrating one embodiment of an object analyzer.

FIG. 2 depicts a diagrammatic representation of one embodiment of an object analyzer 120 for analyzing an object 107. Object analyzer 120 can comprise various modules to process an object 107. Reading source data module 154 can open the object 107. Format identification module 156 examines the object to determine what type of file or data the object 107 comprises. Archive expansion module 158 unzips files or otherwise decompresses files if the object 107 is a compressed file. Decryption module 160 decrypts all or part of the data in the object 107. Text extraction module 162 applies rules to text in the object 107 to extract text for index 124. Language detection module 164 examines the text to determine the language in which the text is written. Classification module 166 applies rules based upon text and metadata to classify content. Encoding module 168 can convert text to a supported encoding. Randomness detection module 170 can analyze data to be indexed to reject random information.

When an object is added to a search system, two types of information are generally indexed, one or both full text and metadata. As an example, suppose an object being added to a search system is a text file, the text or content of the file is indexed as well as information about the file. In some cases, the metadata itself may include important information associated with the object. This metadata may need its own descriptive metadata indicating attributes of the metadata. In some cases, the metadata on its own without full text content is sufficient to represent an object.

To this end, object analyzer 120 may include modules that can derive metadata for object 107. For example, a document management system may provide a limited amount of metadata with the object 107. Object analyzer 120 can derive other metadata from the metadata provided, text or other properties of the object 107. As a specific example, a filter or piece or code that extracts the text from a PowerPoint presentation might also create metadata about the presentation. In this example, the metadata which is not provided by the document management system and which is derived by object analyzer 120 may include the number of slides in the presentation, the title of the file, the name of the presentation author, or the size of paper the presentation was designed to print on. More complex examples of derived metadata might include statistical analysis to generate a list of keyword or key concepts in the document; determining the subject person or company of the text; sentiment analysis—is the tone of the text positive or negative; or language identification—in what language is the text written. Further examples of metadata that may either be provided by the document management system (or other application) or derived by the analyzer may be the date the object was created, the size of the object in bytes, the name of the object, a description of the object or the like.

The embodiment of FIG. 2 is provided by way of example. Object analyzer 120 may include any number of other modules to analyze an object and extract text 174 and metadata 172 to be indexed. Object analyzer 120 may be a portion of a larger program, such as a document management program, may be a separate program or may be implemented according to any suitable programming architecture. In one embodiment, the process of determining metadata 172 and text 174 to be indexed may be carried out by any number of different programs on a computer system or distributed across computer systems.

Metadata 172 and text 174 thus processed by object analyzer 120 may be provided to a search engine. An example search engine will now be described with reference to FIG. 3.

Figure 3:
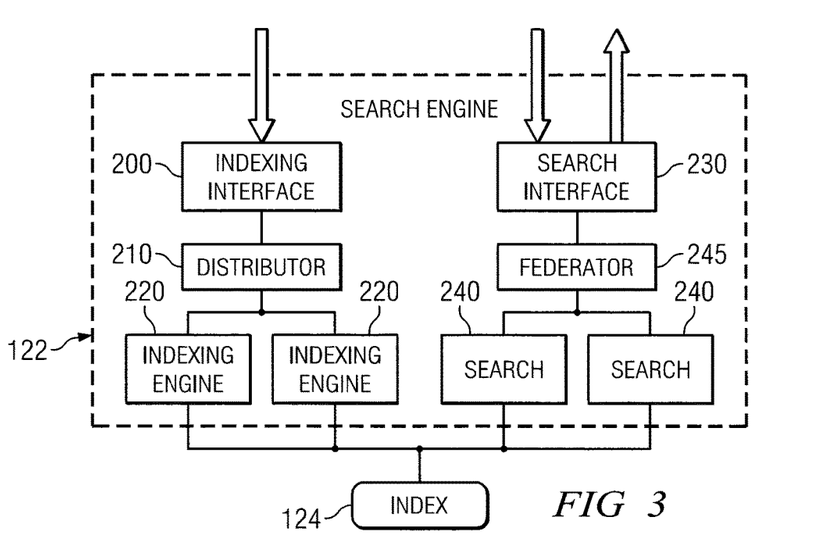
FIG. 3 depicts a functional block diagram illustrating one embodiment of a search engine.

FIG. 3 depicts a diagrammatic representation of logical blocks for one embodiment of a search engine 122. Search engine 122 may provide an indexing interface 200 that receives indexing requests (e.g., from object analyzer 120) or other source. A distributor module 210 may distribute the indexing requests to indexing engine 220 that act on an indexing request to update index 124. Search engine 122 may also include a search interface 230 to receive queries (e.g., from a content server or other source). Search interface 230 may send queries to search modules 240. Federator 245 gathers the results from all search modules together, and generates a response to the query received through search interface 230. Search modules 240 are responsible for performing searches on an index partition, computing relevance score, sorting results, and retrieving metadata regions to return in a query.

When objects are received by search engine 122, search engine 122 allows for the use of attributes for metadata field values. As described in further detail below, such "metadata for metadata" may be represented as key/value pairs that further define metadata field values and that may be stored within an auxiliary data structure within index 124. For example, a metadata field value may have an attribute where a key is "lang," and the value may be "en" or "fr." This allows one or more specific attributes to be associated with a particular metadata field value. It should be noted here that, in this example, the attribute key is language, so the value ("en" or "fr") is text based. However, other types of attributes are also possible. Example attribute types may include but are not limited to integers, floating point numbers, currency, date, percentage, symbol, enumerated lists, geocodes, coordinates, Boolean, or any other types of data. It is not required that all attribute values are text based. This is also true for metadata field values. In addition to text metadata examples described herein, other types of metadata in a search index may also have attributes (text or otherwise) associated therewith. Thus, in one embodiment, there can be a single type of metadata having homogeneous metadata field values associated with a single type of attributes having homogeneous attribute values. In one embodiment, there can be various types of metadata having heterogeneous metadata field values associated with various types of attributes having heterogeneous attribute values. In one embodiment, there can be a single type of metadata having homogeneous metadata field values associated with various types of attributes having heterogeneous attribute values. In one embodiment, there can be various types of metadata having heterogeneous metadata field values associated with a single type of attributes having homogeneous attribute values.

Search interface 230 may be configured to receive a search query, and search index 124 for objects that have a specific attributes. For example, a search query may locate objects that contain the term "rouge" for a French language value for a metadata field name titled "OTNAME." The search query may be represented by the following syntax "where [region "OTName"][attribute "lang"="fr"] "rouge."

Query language may also be configured to permit sorting results of a search using an attribute. For example, an object may include metadata field values for both French and English languages with attributes identifying the corresponding language. If a user has indicated a preference in French, search results may be sorted based on attributes identifying the French language. In this case, the results may be sorted by the metadata field values with a metadata field name which has an attribute value of "fr" in ascending order. Since there is no guarantee that a desired attribute exists for a metadata field value, various rules may be used to determine the sort order. One example of sort ordering rules would be:

Use a specified attribute if it exists (for example, "fr");
Otherwise, if a default attribute for this metadata field name exists, use it;
Otherwise, use an attribute which is first, alphabetically;
If there are no attributes, then use the first value.

Default attributes may be stored within search modules 240. A set of metadata field names for which default attributes which may be used may be first defined, followed by default attribute key/value pairs for each of these metadata field names.

In the above example, a user has constructed the search queries. It should be noted, however, that the user could be any system that issues queries to the search system, and may include other computer programs searching on behalf of other users, creating reports or running automatic processes. As described above, there can be many different types of metadata and/or attributes in the search index. Thus, the search queries are not restricted to "text" based search terms.

The embodiment of FIG. 3 is provided by way of example. Search engine 122 may include any number of other modules or configurations to update and search an index. For example, search modules 240 and indexing engines 220 may be a single module. Search engine 122 may be a portion of a larger program, such as a document management program, may be a separate program or may be implemented according to any suitable programming architecture. In one embodiment, the processes of search engine 122 may be distributed across multiple computer systems. Furthermore, while in FIG. 3, index 124 is illustrated as a single index, index 124 may comprise a set of smaller indexes. For example, a separate index can be used by each indexing engine.

Figure 4:
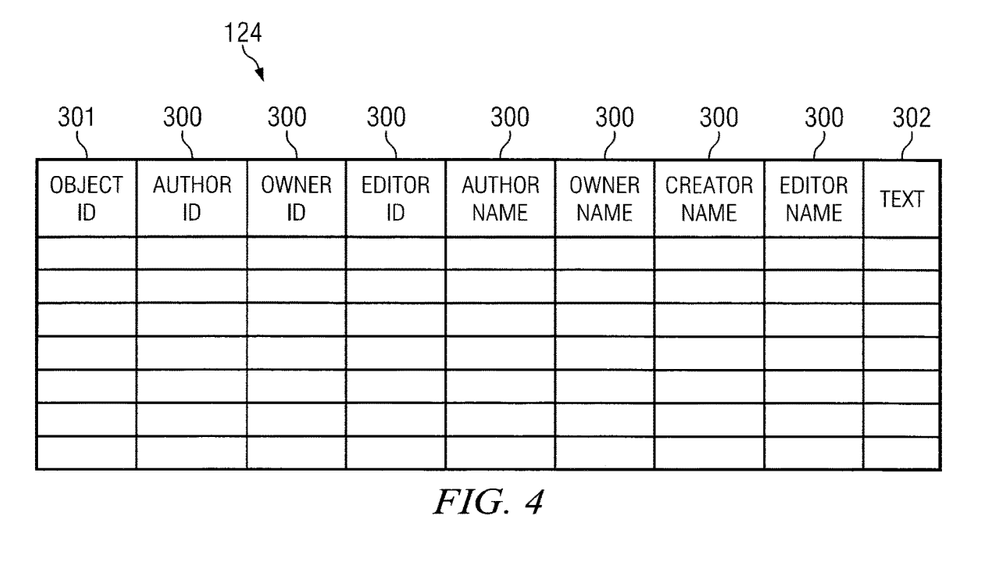
FIG. 4 depicts a diagrammatic representation of one embodiment of regions or fields for a portion of an index.

FIG. 4 depicts a diagrammatic representation of one embodiment of regions or fields for a portion of index 124. Index 124 includes a list of some or all objects 107 in repository 105 (FIG. 1), each identified by a unique identifier 301 (also referred to as object ID). Index 124 further includes a set of metadata regions 300 (also referred to as metadata fields). A metadata field 300 may include more than one entry for an object. The metadata fields can each have associated values in value storage locations within storage unit 118. In other embodiments, the values may be discarded. The index may include a list of dictionary terms contained in the metadata values of the object and pointers to where the metadata values corresponding to the field are stored. Index 124 may also include other regions for an object, such as a text region 302. Text region 302 may, for example, include a list of terms in the text of an object.

For each of the metadata fields 300 within index 124, additional attributes may be attached or assigned to metadata field 300. Therefore, the metadata fields 300 within index 124 may have a plurality of metadata defining attributes or characteristics of the metadata. For example, a metadata field name 300 associated with an "Author name" may have additional attributes identifying if the author is a "primary" or "secondary" author.

A search query may be constructed to identify object IDs 301 with a specific author, while another search query may be constructed to identify object IDs 301 with a specific author being a "secondary author." In another embodiment, an author field name 300 may have an attribute with a key as "contributor" with values identifying if the author was a "sole author," "creator," "editor," etc. A search query can then be created to locate object IDs 301 for a specific person where the person was an "editor" of the document.

While shown as a single index, index 124 may be partitioned. In index partitioning, in one embodiment, the index of objects in repository 105 may be split into multiple indexes such that some objects are listed in one index partition, while other objects are listed in the other index partitions. Index partitioning may also reduce resource usage and search time. Furthermore, separate indexes may be maintained for metadata and text and/or different metadata regions or fields. Index 124 can be stored according to any suitable storage scheme.

Figure 5:
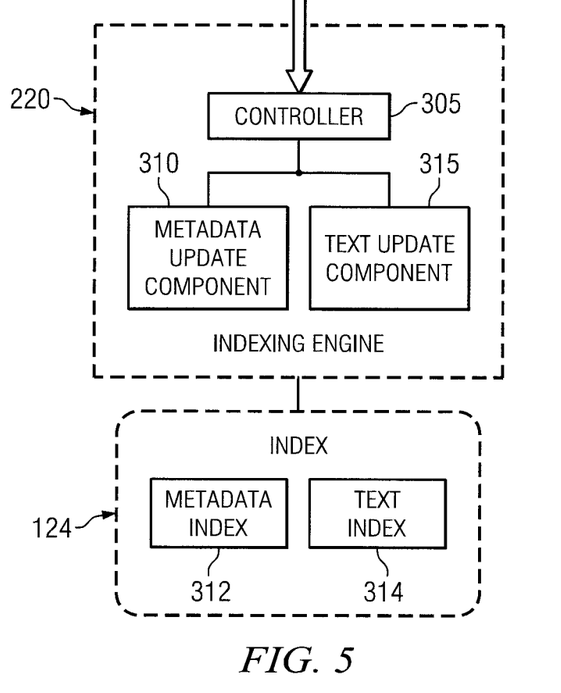
FIG. 5 depicts a functional block diagram illustrating one embodiment of an indexing engine.

FIG. 5 depicts a diagrammatic representation of one embodiment of an indexing engine 220 to maintain index 124. In this embodiment, indexing engine 220 can include an indexing controller 305, a metadata update component 310 and a text update component 315. In this embodiment, index 124 is maintained as a separate metadata index 312, which contains metadata for objects in repository 105, and text index 314, which contains content text from objects in repository 105.

Indexing controller 305 receives indexing requests (e.g., from a distributor, another application or other source). In the embodiment of FIG. 5, the indexing request may include an instruction to add an object, delete an object, delete an object, modify an object or replace an object in index 124. The indexing request may also include the information to be added or changed, such as the full text content to be indexed and the associated metadata for the object. The indexing request may also contain derived metadata.

The text (derived text or full text content) of an indexing request may be a text file. It could be data exported from a database or other information system. Commonly, the text is the human-readable information within a document composed on a computer. In this scenario, a file such as a Microsoft Word document would be analyzed by a filtering step to extract the text, which can be stripped of unnecessary information such as fonts, styles, or page layout information.

The metadata portion of an indexing request may specifically be provided by an application providing the indexing request. This might be data such as an identifier for the object, the date or time it was first added to the system, or the identity of the user who manages the object.

Derived metadata can include metadata inferred from the text content. For example, the filter or code that extracts the text from a PowerPoint presentation might also create metadata about the presentation. In this example, the generated metadata may include the number of slides in the presentation, the title of the file, the name of the presentation author stored in the PowerPoint file, or the size of paper the presentation was designed to print on. More complex examples of derived metadata might include statistical analysis to generate a list of keyword or key concepts in the document, determining the subject person or company of the text, sentiment analysis (the positive or negative tone of the text), or identification of the language in which the text is written. Derived metadata may also include data inferred from processing an object. For example, in processing a PowerPoint presentation, derived metadata may include a timestamp of the time the PowerPoint was processed or the location where the PowerPoint presentation was processed.

An indexing engine can receive an indexing request from an application, distributor or other source. An indexing request specifies an operation to be taken on index 124 for an object and any metadata or text for that action. For context, an application that generates an indexing request might be a corporate document management system, a web site with a search capability such as an online store, or a desktop search program for email.

According to one embodiment, for example, an indexing request can take the form of an indexing object that includes a unique identification for an object, an operation, the metadata or text regions affected and the metadata and/or text for the index. By way of example, but not limitation, indexing operations may include adding, replacing, modifying and deleting information in the index, or combinations thereof. The following provides some exemplary operations that may be included in indexing requests.

AddOrReplace: this operation can be used to create new objects in the index. According to one embodiment, if the object does not exist, it will be created, but if an entry with the same object identification exists, then it will be completely replaced with the new data, equivalent to a delete and add.

AddOrReplace: this function may distinguish between content and metadata. If an object already exists, and metadata only is provided, the existing full text content is retained.

AddOrModify: this operation will update an existing object, or create a new object if it does not already exist. When modifying an existing object, only the provided content and metadata are updated. Any metadata regions that already exist which are not specified in the AddOrModify command will be left intact.

Delete: this operation will remove an object from the index, including both the metadata and the content.

Indexing controller 305, according to one embodiment, is a component which interprets the indexing request to determine how it should be processed. Indexing controller 305 can identify whether a text indexing command exists, and, if so, send the command with the necessary parameters to the text update component 315. Indexing controller 305 can likewise determine if any metadata indexing operations are required, and if so, send the command with necessary parameters to the metadata update component 310.

Text update component 315 is responsible for processing requests to index full text content. This may include tasks such as maintaining a dictionary of search terms, maintaining the internal search data structures, and updating the storage representation of the text portion of the search index in memory or on disk as appropriate. Text update component 315 may support instructions such as Add an Object, Replace an Object, or Delete an Object.

In the context of this disclosure, the phrase "search term" represents a technical concept or interpretation. For example, a search term in the context of this disclosure can be a word, a string, or any combination of the following:
  phrases
  numbers
  strings
  logical operations (e.g., AND, OR, NOT, etc.)
  ordering or operations (e.g., using parenthesis)
  relationships (e.g., greater than, less than, not equal to, etc.)
  similarities based on thesaurus, stemming, sounds-like, etc.
  wildcards and pattern matching To this end, a search term can also refer to any term that is used in a query and that has been modified or generated by any commonly used techniques.

For context, a search term could be a word "john" or a more complex expression like: (>"bob" or !=("123" or a*)) and (sounds-like "smith" or thesaurus "doctor" or "medical doctor" or stem "medical").

Referring to FIG. 5, in one embodiment, metadata update component 310 is responsible for processing requests to index metadata 312 associated with an object in index 124. This may include building and maintaining dictionaries of search terms, maintaining internal search data structures, and updating the representation of the metadata portion of the search index in memory or on disk as appropriate. Metadata update component 310 may support instructions such as Add an Object, Replace an Object, or Delete an Object.

The embodiment of FIG. 5 is provided by way of example. Indexing engine 220 may include any number of other modules to update and search an index. Indexing engine 220 may be a portion of a larger program, such as a document management program, may be a separate program or may be implemented according to any suitable programming architecture. In one embodiment, the processes of indexing engine 220 may be distributed across multiple computer systems.

Figure 6:
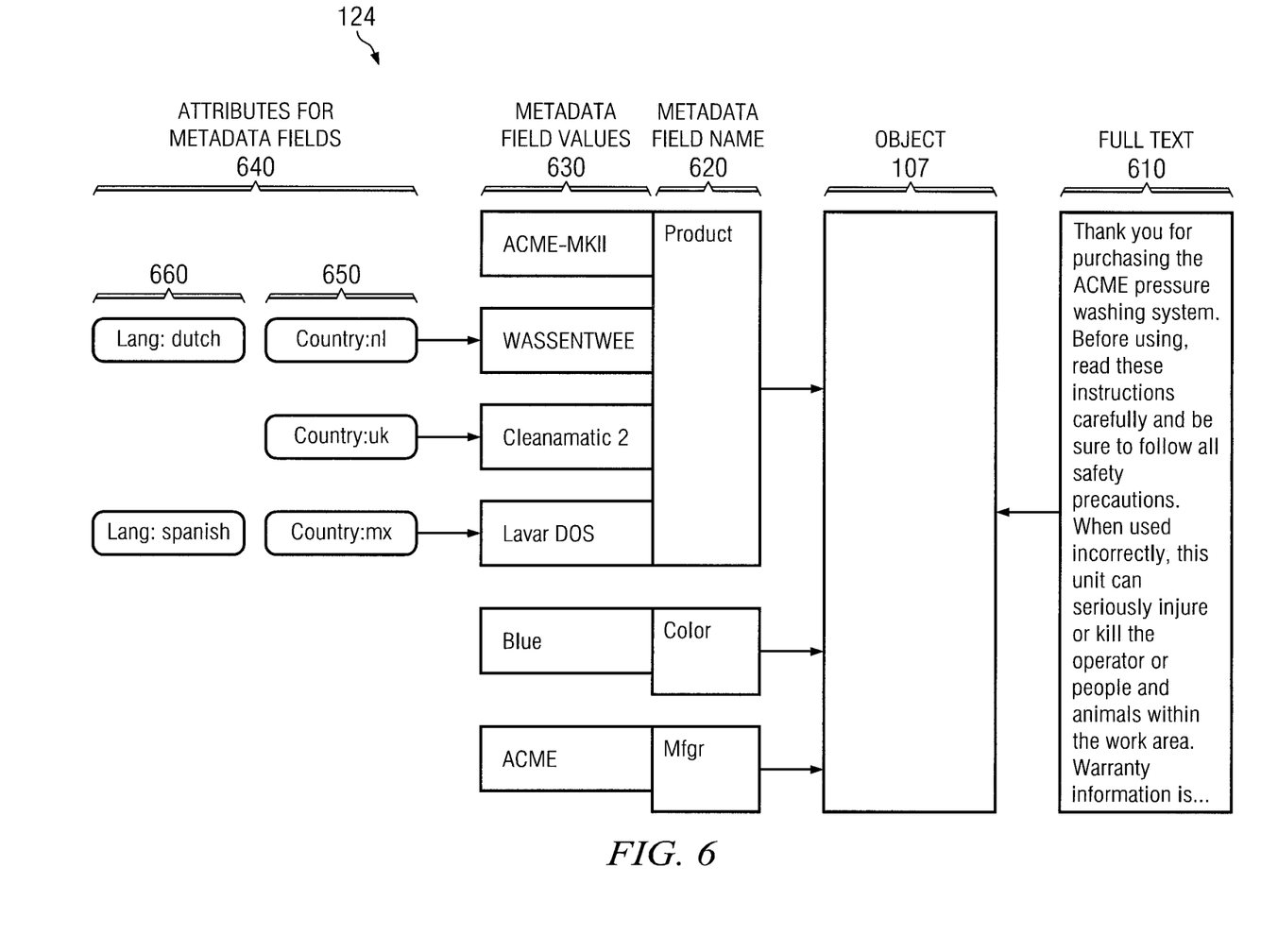
FIG. 6 depicts a diagrammatic representation of one embodiment of an indexed object having metadata field names, each having one or more metadata field values associated therewith, each of the one or more metadata field values having one or more metadata attributes assigned or associated therewith.

FIG. 6 depicts a diagrammatic representation of a portion of object 107 in search index 124. Object 107 may represent any type of object that can be indexed in a search index. For example, a text object, an image object, a file system object, a proxy object, a content object, a metadata object, etc. One skilled in the art will appreciate that object 107 can be any type of digital data that may have text, metadata, or both. Take an image object as an example, there may be little or no text, other than an object identifier and perhaps a date, provided to object analyzer 120. It may still be indexed into search index 124 and be searchable via search engine 122. As another example, a folder may essentially be an empty object serving as a logical container or placeholder having just an object identifier. A text document, however, may have both text and metadata. Thus, object 107 may have metadata (actual and/or derived) associated therewith, but may not contain a full text component. In the non-limiting example of FIG. 6, object 107 is shown to have full text 610 which may be indexed in text index 314. However, it is not required that object 107 has or references full text 610.

Object 107 may have a plurality of metadata field names 620 associated therewith. These metadata field names may represent various types of metadata associated with object 107, including those that were provided to object analyzer 120 with object 107 and, where applicable, those that were derived or otherwise generated by object analyzer 120. Each of metadata field names 620 may have one or more metadata field values 630. These metadata field values may identify characteristics or provide a description of the plurality of metadata field names 620. For example, a metadata field name 620 may be associated with a "color," and the metadata field value 630 may identify a color (i.e., "blue") of a product associated with object 107. Another metadata field name 620 may identify a "product" and may have different metadata field values 630 for the same product depending upon what country the product is being sold.

As illustrated in FIG. 6, in embodiments disclosed herein, one or more of metadata field values 630 can have one or more attributes assigned thereto or associated therewith. In the example of FIG. 6, there are three metadata fields, namely, "Product", "Color", and "Mfgr". For the metadata field named "Product", there are four values: "ACME-MKII", "WASSENTWEE", "Cleanamatic 2" and "Lavar DOS". For the metadata field named "Color", there is a single value "Blue". For the metadata field named "Mfgr", there is a single value "ACME". In this case, some of the values 630 for the metadata field named "Product" 620 have one or more attributes 640 assigned thereto or associated therewith.

Attributes 640 can have different attribute fields and attribute values. Attributes 640 may be used to further classify, define, group or otherwise provide data about an associated metadata value 630 and/or metadata field 620. As such, attributes 640 may be thought of as metadata for the metadata. In the example of FIG. 6, attribute 640 may have first attribute 650 and second attribute 660 associated with metadata field value 630 "WASSENTWEE" for metadata field name 620 "Product". In one embodiment, it may be desired to identify country, language, etc. associated with each metadata field value 630. Accordingly, first attribute 650 may identify a country (an attribute field or key) associated with "WASSENTWEE" and may have an attribute value of "nl". Second attribute 660 may identify a language (an attribute field or key) also associated with "WASSENTWEE" and may have an attribute value of "dutch". In one embodiment, search index 124 provides for attributes 640 to be represented as key/value pairs for metadata values 630 corresponding to an object to be indexed. In this example, first attribute 650 may be represented by a key-value pair of "country:nl" and second attribute 660 may be represented by a key-value pair of "Lang:dutch".

Like metadata, these "metadata for metadata" can be indexed. In some embodiments, indexing commands can be extended to allow for specifying attributes when adding or modifying metadata field values in the index. When a system is indexing an object, it could do so using syntax like this:

"<Product lang='dutch'>WASSENTWEE</Product>."

This is representative of how metadata attributes can be indexed. Other syntax may also be possible.

Multiple attributes 640 may be assigned to an individual metadata value 630. A user of the index 124 may dynamically create, update, delete and/or add additional attribute fields to further clarify the metadata. For example, optional fields may be dynamically entered, created and attached to a metadata field value 630 based on any association, correlation or any desired reason related to metadata fields 620 or metadata values 630. In one embodiment, attributes thus created may be searchable substantially instantaneously. Further, attributes 640 may be attached to a metadata field value 630 while an object is being indexed, modified, before an object is indexed, after an object is indexed, or at any other desired time. For example, a user could add an attribute 650 title "Lang" to further identify at least one of the metadata fields 620 by the language used to express the associated metadata value 640.

Attributes 640 may further define or clarify characteristics of the metadata, whether or not the attributes 640 are associated with the full text 610 of the indexed object. For example, a Japanese document may be indexed with a title in English as well in Japanese and attributes 640 may define the language of the title. Furthermore, as discussed above, it is possible that object 107 is empty and therefore does not have a text component. Even so, any metadata field value 630 of object 107 can still have any number of attribute 640 associated therewith.

Moreover, attributes 640 for a particular metadata field value 630 of a particular metadata field name 620 may or may not be correlated or associated with other attributes for the same metadata field name 620. For example, in FIG. 6, "Product" 620 has four metadata field values 630—"ACME-MKII" has no attributes associated therewith; "Cleanamatic 2" has a single attribute 650, represented by a key-value pair of "Country:uk"; and each of "WASSENTWEE" and "Lavar DOS" has two associated attributes 650 and 660. Further, because attributes 640 can be optional, some metadata values 630 may not include additional attributes 640. For example, there are no attributes 640 for metadata field value 630 "Blue" corresponding to metadata field name 620 "Color" and no attributes 640 for metadata field value 630 "ACME" corresponding to metadata field name 620 "Mfgr".

In one embodiment, attributes 640 (metadata for metadata) are indexed and searchable via metadata index 312 of search index 124. Various search queries can be constructed to search metadata with specific attributes 640, or search by a metadata field 620 while ignoring the attributes 640, or search for specific attributes 640 and by metadata fields 620. Also, search index 124 may allow for the addition of attributes 640 to metadata when adding, modifying or searching for metadata in the search index 124. Search index 124 may be able to store, add, delete and/or update attribute(s) 640 corresponding to metadata field value 630, include attributes 640 in search queries within the search system and/or sort or order the search results based on the attribute 640.

Using attributes 640, search queries may be constructed to efficiently search, sort and order objects via search index 124. The search queries may be based on the attributes 640 and used in addition to search queries based on metadata field names 620 or metadata values 630 to limit, reduce or further clarify search results. In further example embodiments, the search queries may also be constructed using default attribute fields that are defined within a search index. The default attribute fields may be defined by attribute key/value pairs for at least one metadata field name 620. For example, a default attribute field may be constructed as a priority list such as listing objects where a title contains an attribute 640 in a certain language and/or the metadata has an attribute 640 indicated a default country.

In one embodiment, a search system may provide a user with information on attributes 640 that further define or clarify a piece of metadata associated therewith. For example, a user may search, via an interface, for records that contain a metadata value 630 "Cleanamatic." However, numerous products may have the metadata value 630 "Cleanamatic" as a product name. Accordingly, a user may desire or require constructing a more specific or efficient search using by searching attributes 640. In one such embodiment, a user may construct a search query to locate records with "Cleanamatic" as the metadata field value 630 for metadata field name 620 "product" and where the country associated with the product is the United Kingdom. Therefore, a user may construct a search that also includes an attribute 640 titled "country," where the attribute value is the "UK." The search engine may consider attributes 640 in search queries, return attributes 640 as part of search results, sort and/or order the search results based upon the attributes 640. The search results may be sorted such that objects that have "Cleanamatic" as the field value 630 for a metadata field name 620 and an attribute 640 having a key-value pair indicating the UK as the country associated with the object are displayed first.

If a user desires to search index 124 for documents with the word "red" in an English title, a search query may be constructed using a search string like this:

"[region "OTName"][lang='en'] red."

This is representative of how metadata attributes can be searched. Other syntax may also be possible.

Search results may be presented to a user where a document entitled "The red car" and the title of the document is in English, even if the full text 610 of the document is in Japanese. It can be noted the search will not retrieve documents with "red" in the title if the metadata does not have the attribute "English." In this example, "red" is the metadata field value for the metadata field name "OTname" and the attribute for the metadata field value "red" is represented by a key of "lang" and a corresponding attribute value "en".

Further embodiments allow for ordering and/or sorting of search results by attributes 640. A user may determine criteria for searching, sorting and/or ordering attributes 640 of an object based on a preference of the user or empirical data. Because attributes 640 may be sparse or attribute(s) 640 may not exist, a sort algorithm may rely on default system preferences, such as sorting by any available attribute value.

Additionally, a user may further use attributes 640 to sort the search results from searches based on attributes 640. For example, a search query may be entered to locate attributes 640 for metadata values 630 that include both French and English words in the title field of object 107. However, the user may prefer titles of metadata values 630 that are in French. Therefore, the user may construct a search query that specifies that the objects be presented in ascending or descending order based upon an attribute indicating the title is in French.

In another embodiment, a specific search query indicates the ordering or sorting of the search results. A search query may indicate an ordering be "ORDEREDBY 'OTNAME' SEQ 'fr'." In this example, the results may be sorted or ordered by the metadata values 630 within the metadata field name 620 that have an attribute field 640 value "fr," in ascending order.

In other example embodiments, it is possible that no objects within the system include a desired attribute 640. Therefore, a user may set guidelines, rules or criteria for sorting and/or ordering the search results based on the attributes 640. In one example embodiment the following guidelines may be used. The search system may order the search results by results where a specified attribute exists, for example a title in French. Otherwise, if there is any default attribute corresponding to the desired attribute, the default attribute may be used to order the results of the search. The search results may be ordered alphabetically based on the attributes 640 associated with the metadata field values 630. If there are no attributes 640 associated with the metadata field values 630, the objects may be sorted by their order in the search index.

Attributes 640 may be associated with metadata values 630 in any number of ways. By way of example, but not limitation, a search system may include storage for attribute values. Pointers in value storage for the metadata values can point to the attribute values in attribute storage for a particular metadata value. Consequently, when a particular metadata value is retrieved, the associated attribute values may also be retrieved. In other embodiments, pointers or other references can be stored in a separate file (or other data structure).

Figure 7:
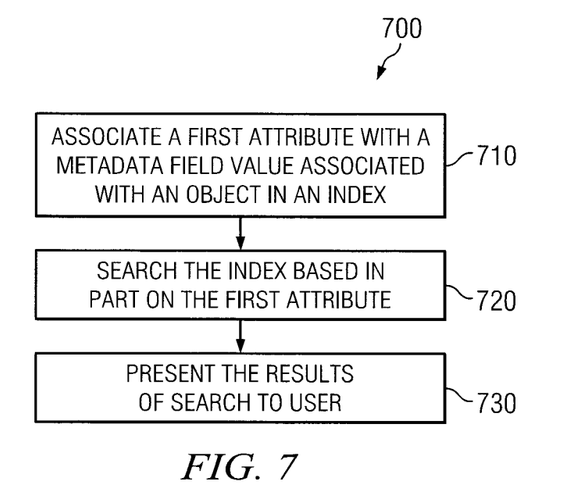
FIG. 7 depicts a flow diagram illustrating one embodiment of a method for using a search index that includes searchable metadata attributes.

Moving now to FIG. 7, one embodiment 700 of searching an index based on attributes for metadata is depicted.

At step 710, an attribute may be associated with a metadata field value, and be stored in the index as a key-value pair. The metadata field value may be associated with a metadata field name and the metadata field name may be associated with an object within the index. The attribute, which can be one of many for the same metadata field value, may be dynamically created by a user and associated with the metadata field value at any time. For example, a user may create an attribute to be associated with a metadata field value either before the object is indexed, after the object is indexed, or while the object is being indexed.

At step 720, a user may construct a search query. The search query may be associated with the attribute which is associated with the metadata field value. Then, a processor may search the index based on the search query associated with the attribute which is associated with the metadata field value.

At step 730, the search results may be presented via a user interface on a user device to a user. In further embodiments, the search results may be sorted before or after being presented to the user using the attribute which is associated with the metadata field value.

Other alternative embodiments are also possible.

Embodiments disclosed herein provide mechanisms for attributes to be attached or assigned to metadata of an object being or already indexed in a search index. The attributes allow computer applications to provide new capabilities to end users. For example, in a document management system, a "name" field for an object may use an attribute to identify a language in which the name is expressed, such as French or English. Users can then search for "names," or they can search specifically for French or English names. Users may then be able to sort the resulting search based on the attribute and/or user's preferences.

Embodiments of a computerized search system disclosed herein may be more efficient than conventional computerized search systems. For example, with metadata for metadata thus defined, the inventive system does not require separate metadata field names for a "French Name" and "English Name," only "Name." This may reduce the complexity of managing metadata fields, and simplify searches for a user.

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein (and in particular, the inclusion of any particular embodiment, feature or function within the Abstract or Summary is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a computer communicatively coupled to a network (for example, the Internet), another computer, or in a standalone computer. As is known to those skilled in the art, a suitable computer can include a CPU, at least one read-only memory ("ROM"), at least one random access memory ("RAM"), at least one HD, and one or more input/output ("I/O") device(s). The I/O devices can include a keyboard, monitor, printer, electronic pointing device (for example, mouse, trackball, stylus, touch pad, etc.), or the like.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" or is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include RAMs, ROMs, HDs, data cartridges, magnetic tapes, floppy diskettes, flash memory drives, optical data storage devices, CD-ROMs, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a general-purpose CPU, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited to only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise. The scope of the present disclosure should be determined by the following claims and their legal equivalents.

What is claimed is:

1. A system, comprising:
a processor;
a non-transitory computer readable medium storing a search and instructions for:
associating a first attribute value for an attribute field to a first metadata field value, wherein the attribute field is related to a characteristic of the first metadata field value, the first metadata field value is associated with a metadata field name, the metadata field name and the first metadata field value are associated with a first object in an object repository and the first attribute value for the attribute field is specific to an attribute, the first object, and the first metadata field value with which it is associated;
associating a second attribute value for the attribute field to a second metadata field value, wherein:
the attribute field is related to a characteristic of the second metadata field value, the second metadata field value is associated with the metadata field name,
the metadata field name and the second metadata field value are associated with a second object in an object repository, and
the second attribute value for the attribute field is specific to the attribute, second object, and second metadata field value with which it is associated;
indexing the attribute and the first attribute value in association with the first metadata field and the first metadata field value associated with the first object in a search index;
indexing the attribute and the second attribute value in association with the second metadata field and the second metadata field value associated with the second object in the search index; and
making the first attribute value searchable via the indexing of the attribute and the first attribute value in the search index through a search interface adapted to allow a search query identifying the first metadata field, the attribute, and a search attribute value for the first metadata field value for the first metadata field and to present search results from comparing the first attribute value in the search index with the search attribute value identified in the search query.

2. The system of claim 1, wherein the attribute is represented as a key-value pair in the search index.

3. The system of claim 2, wherein both the key and value of the key-value pair are searchable.

4. The system of claim 1, wherein the instructions are further for sorting the search results based on attribute values for the attribute.

5. The system of claim 1, wherein the search results are sorted after they are presented to a user.

6. The system of claim 1, wherein the attribute, first attribute value or second attribute value are dynamically created after an indexing of the first object or second object.

7. The system of claim 1, wherein the first attribute value or second attribute value is a text, numerical, currency, date, percentage, symbol, enumerated list, geocode, coordinate or Boolean value.

8. A method, comprising:
associating a first attribute value for an attribute field to a first metadata field value, wherein the attribute field is related to a characteristic of the first metadata field value, the first metadata field value is associated with a metadata field name, the metadata field name and the first metadata field value are associated with a first object in an object repository and the first attribute value for the attribute field is specific to an attribute, the first object, and the first metadata field value with which it is associated;
associating a second attribute value for the attribute field to a second metadata field value, wherein:
the attribute field is related to a characteristic of the second metadata field value, the second metadata field value is associated with the metadata field name, the metadata field name and the second metadata field value are associated with a second object in an object repository, and
the second attribute value for the attribute field is specific to the attribute, second object, and second metadata field value with which it is associated;

indexing the attribute and the first attribute value in association with the first metadata field and the first metadata field value associated with the first object in a search index;

indexing the attribute and the second attribute value in association with the second metadata field and the second metadata field value associated with the second object in the search index; and making the first attribute value searchable via the indexing of the attribute and the first attribute value in the search index through a search interface adapted to allow a search query identifying the first metadata field, the attribute, and a search attribute value for the first metadata field value for the first metadata field and to present search results from comparing the first attribute value in the search index with the search attribute value identified in the search query.

9. The method of claim 8, wherein the attribute is represented as a key-value pair in the search index.

10. The method of claim 9, wherein both the key and value of the key-value pair are searchable.

11. The method of claim 8, wherein the instructions are further for sorting the search results based on attribute values for the attribute.

12. The method of claim 8, wherein the search results are sorted after they are presented to a user.

13. The method of claim 8, wherein the attribute, first attribute value or second attribute value are dynamically created after an indexing of the first object or second object.

14. The method of claim 8, wherein the first attribute value or second attribute value is a text, numerical, currency, date, percentage, symbol, enumerated list, geocode, coordinate or Boolean value.

15. A non-transitory computer readable medium, comprising instructions for:

associating a first attribute value for an attribute field to a first metadata field value, wherein the attribute field is related to a characteristic of the first metadata field value, the first metadata field value is associated with a metadata field name, the metadata field name and the first metadata field value are associated with a first object in an object repository and the first attribute value for the attribute field is specific to an attribute, the first object, and the first metadata field value with which it is associated;

associating a second attribute value for the attribute field to a second metadata field value, wherein:

the attribute field is related to a characteristic of the second metadata field value, the second metadata field value is associated with the metadata field name, the metadata field name and the second metadata field value are associated with a second object in an object repository, and the second attribute value for the attribute field is specific to the attribute, second object, and second metadata field value with which it is associated;

indexing the attribute and the first attribute value in association with the first metadata field and the first metadata field value associated with the first object in a search index;

indexing the attribute and the second attribute value in association with the second metadata field and the second metadata field value associated with the second object in the search index; and making the first attribute value searchable via the indexing of the attribute and the first attribute value in the search index through a search interface adapted to allow a search query identifying the first metadata field, the attribute, and a search attribute value for the first metadata field value for the first metadata field and to present search results from comparing the first attribute value in the search index with the search attribute value identified in the search query.

16. The non-transitory computer readable medium of claim 15, wherein the attribute is represented as a key-value pair in the search index.

17. The non-transitory computer readable medium of claim 16, wherein both the key and value of the key-value pair are searchable.

18. The non-transitory computer readable medium of claim 15, wherein the instructions are further for sorting the search results based on attribute values for the attribute.

19. The non-transitory computer readable medium of claim 15, wherein the search results are sorted after they are presented to a user.

20. The non-transitory computer readable medium of claim 15, wherein the attribute, first attribute value or second attribute value are dynamically created after an indexing of the first object or second object.

21. The non-transitory computer readable medium of claim 15, wherein the first attribute value or second attribute value is a text, numerical, currency, date, percentage, symbol, enumerated list, geocode, coordinate or Boolean value.

* * * * *